(12) United States Patent
Shimozono et al.

(10) Patent No.: US 7,629,078 B2
(45) Date of Patent: Dec. 8, 2009

(54) CYLINDRICAL BATTERY CAPABLE OF PREVENTING OCCURRENCE OF DEFECTS DUE TO VIBRATION-ABSORBING RING

(75) Inventors: Kazuki Shimozono, Osaka (JP); Hiroyuki Inoue, Osaka (JP); Akifumi Nagao, Osaka (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 304 days.

(21) Appl. No.: 11/905,409

(22) Filed: Sep. 28, 2007

(65) Prior Publication Data
US 2008/0096107 A1    Apr. 24, 2008

(30) Foreign Application Priority Data
Sep. 29, 2006    (JP) .............................. 2006-268783

(51) Int. Cl.
*H01M 2/18* (2006.01)
(52) U.S. Cl. ................. 429/164; 429/94; 429/208; 29/623.2
(58) Field of Classification Search .............. 429/65, 429/94, 164, 174, 208, 185; 29/623.2
See application file for complete search history.

(56) References Cited

U.S. PATENT DOCUMENTS

2006/0019159 A1*    1/2006    Mori et al. ................. 429/176

FOREIGN PATENT DOCUMENTS

JP        2002-93455 A    3/2002

* cited by examiner

*Primary Examiner*—Melvin C Mayes
*Assistant Examiner*—James Corno
(74) *Attorney, Agent, or Firm*—Westerman, Hattori, Daniels & Adrian, LLP

(57) ABSTRACT

A cylindrical battery, comprising: a cylindrical casing having a bottom, and has a short-diameter part near an opening thereof; an electrode assembly that is housed in the casing; and a sealing plate that seals the opening, wherein an insulating ring is inserted in a gap between the electrode assembly and the short-diameter part, the insulating ring including a main body, and at least three projections that are dispersively located and project outward from an outer edge of the main body in a diameter direction, and a distance between a design center point of the insulating ring and an outer edge of the main body is not longer than D/2 and a distance between the design center point and an outer edge of each of the projections is longer than D/2 and not longer than 102D/200, where D is an inside diameter of the casing measured within the space.

4 Claims, 4 Drawing Sheets

62

63

$D_1 < D_0$

CYLINDRICAL BATTERY CAPABLE OF PREVENTING OCCURRENCE OF DEFECTS DUE TO VIBRATION-ABSORBING RING

This application is based on application No. 2006-268783 filed in Japan, the content of which is hereby incorporated by reference.

BACKGROUND OF THE INVENTION (1) Field of the Invention

The present invention relates to a cylindrical battery, and particularly relates to a technique for reducing occurrence of defects due to an insulating ring.

(2) Description of the Related Art

In recent years, secondary batteries in various shapes have been widely used in accordance with demand of devices that use the batteries. Meanwhile, the conventional cylindrical shape has versatility, and adopted in various types of batteries, such as nickel cadmium (Ni—Cd) batteries, nickel-metal hydride batteries, alkaline batteries, lithium batteries and lithium-ion batteries.

FIG. 6A is a cross-sectional view of a conventional cylindrical battery 100.

As FIG. 6A shows, the conventional cylindrical battery 100 basically has a structure in which an electrode assembly 120 is housed in a casing 130 filled with an electrolyte, and an opening thereof is sealed with a sealing lid 140.

The casing 130 is formed in a cylindrical shape having a bottom by performing deformation processing on a flat metal plate. The material thereof is a nickel-plated sheet steel, for example.

Also, a short-diameter part 131, where the diameter is locally shorter, is provided near the opening of the casing 130.

An insulating ring 160 which is circular and has insulation properties is provided in a gap between the electrode assembly 120 and the short-diameter part 131.

When the cylindrical battery is given a shock, the electrode assembly 120 sometimes moves in the direction of the axis of the cylinder. The insulating ring 160 is provided for preventing the top end of the electrode assembly 120 from directly contacting the short-diameter part 131.

The sealing lid 140 is formed by affixing a safety valve and so on to a main body formed by performing deformation processing on a material that is the same as the material of the casing 130.

As FIG. 6B shows, a outside diameter $D_1$ of the insulating ring 160 is determined to be shorter than an inside diameter $D_0$ of the casing 130.

This is for inserting the insulating ring 160 into the casing 130 such that the insulating ring 160 is surely placed on the electrode assembly 120.

Although the insulating ring 160 stated above is in a circular shape, it may also be in a shape of a circle that has a plurality of projections from the circumference thereof; an octagon shape, and so on.

Even in the case the insulating ring is in a shape other than the circular shape, the maximum diameter thereof should be shorter than the inside diameter $D_0$ of the casing 130.

However, in the conventional cylindrical battery 100, there is a gap in a direction of the diameter of the casing 130, between an inner wall of the casing 130 and an outer edge of the insulating ring 160. If this gap is wide, there are possibilities, in the manufacturing process for the cylindrical battery 100, that the insulating ring 160 is misaligned, e.g. placed in an inclined condition with respect to the upper surface of the electrode assembly 120, or the insulating ring 160 jumps out of the casing 130 (hereinafter called "the jump-out problem") due to vibrations of the conveyor line.

SUMMARY OF THE INVENTION

The present invention aims to solve the problems described above. The first object of the present invention is to provide a cylindrical battery in which an insulating ring is firmly attached to a desired position such that a jump-out problem is prevented, and it is easy to attach the insulating ring.

The second object of the present invention is to provide a manufacturing-method for a cylindrical battery by which an insulating ring is firmly attached to a desired position such that a jump-out problem is prevented, and it is easy to attach the insulating ring.

The first object is fulfilled by a cylindrical battery, comprising: a casing that is in a shape of a cylinder having a bottom, and has a short-diameter part near an opening thereof; an electrode assembly that is housed in the casing; and a sealing plate that seals the opening, wherein an insulating ring is inserted in a gap between the electrode assembly and the short-diameter part, the insulating ring including a main body, and at least three projections that are dispersively located and project outward from an outer edge of the main body in a diameter direction, and a distance between a design center point of the insulating ring and an outer edge of the main body is not longer than D/2 and a distance between the design center point and an outer edge of each of the projections is longer than D/2 and not longer than 102D/200, where D is an inside diameter of the casing measured within the space.

The second object is fulfilled by a manufacturing method for a cylindrical battery, comprising the steps of: housing an electrode assembly in a casing that is in a shape of a cylinder having a bottom; swaging the casing near an opening thereof to form a short-diameter part; and placing a sealing plate on the short-diameter part and sealing the opening with the sealing plate, wherein the method further comprises the step of: placing an insulating ring onto the electrode assembly after the electrode assembly has been housed in the casing and before the short-diameter part has been formed, the insulating ring including a main body, and at least three projections that are dispersively located and project outward from an outer edge of the main body in a diameter direction, a distance between a design center point of the insulating ring and an outer edge of the main body is not longer than D/2 and a distance between the design center point and an outer edge of each of the projections is longer than D/2 and not longer than 102D/200, where D is an inside diameter of the casing, and in the step of swaging, the short-diameter part is formed nearer the opening than where the insulating ring is placed.

Note that the term "design center point" used above is a reference point for designing the ring. Usually, the lengths of the outside diameter of the ring are determined on the assumption that the "design center point" of the ring is at the center point of the inner circumference of the casing.

The term "dispersively located" means that, when assuming that the outer edge of the ring is in a shape of a circle, the projections are located with little deviation from reference points obtained by equally dividing the circumference of the circle by the count of the projections.

If the count of the projections is three, the reference points are intersection points of the circumference and three lines extending from the center of the circle and forming angles of 120°

According to the stated structure and method, at least three projections are dispersively located such that a distance between the design center point and an outer edge of each of the projections is longer than D/2. Accordingly, when the ring is inserted in the casing, the projections contact the inner wall of the casing and press against the inner wall. Therefore, the ring can be firmly fixed such that it is hardly misaligned.

Moreover, regarding the pressure against the inner wall caused by the ring warping, since the maximum distances from the projections to the design center point is not longer than 102D/200, the amount of the warp of the insulating ring is appropriately adjusted. Furthermore, since the distance from the outer edge of the main body of the ring and the design center point is not longer than D/2, the main body is not pressed against the inner wall of the casing. Therefore, in the manufacturing process for the battery, when inserting the insulating ring into the casing, a so-called insertion defect does not occur. The "insertion defect" means that the ring can not be inserted appropriately because the insertion resistance is too large.

Also, it is preferable that a count of the projections is up to eight.

With the stated structure, the insertion resistance does not become too large.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes the preferred embodiment of the present invention, based on a nickel-metal hydride battery (hereinafter called a "Ni-MH" battery) as an example, which is a type of alkaline storage batteries. Note that the following embodiment is merely an example, and the present invention is not limited to the Ni-MH battery.

Structure of Ni-MH Battery 1

Figure 1:
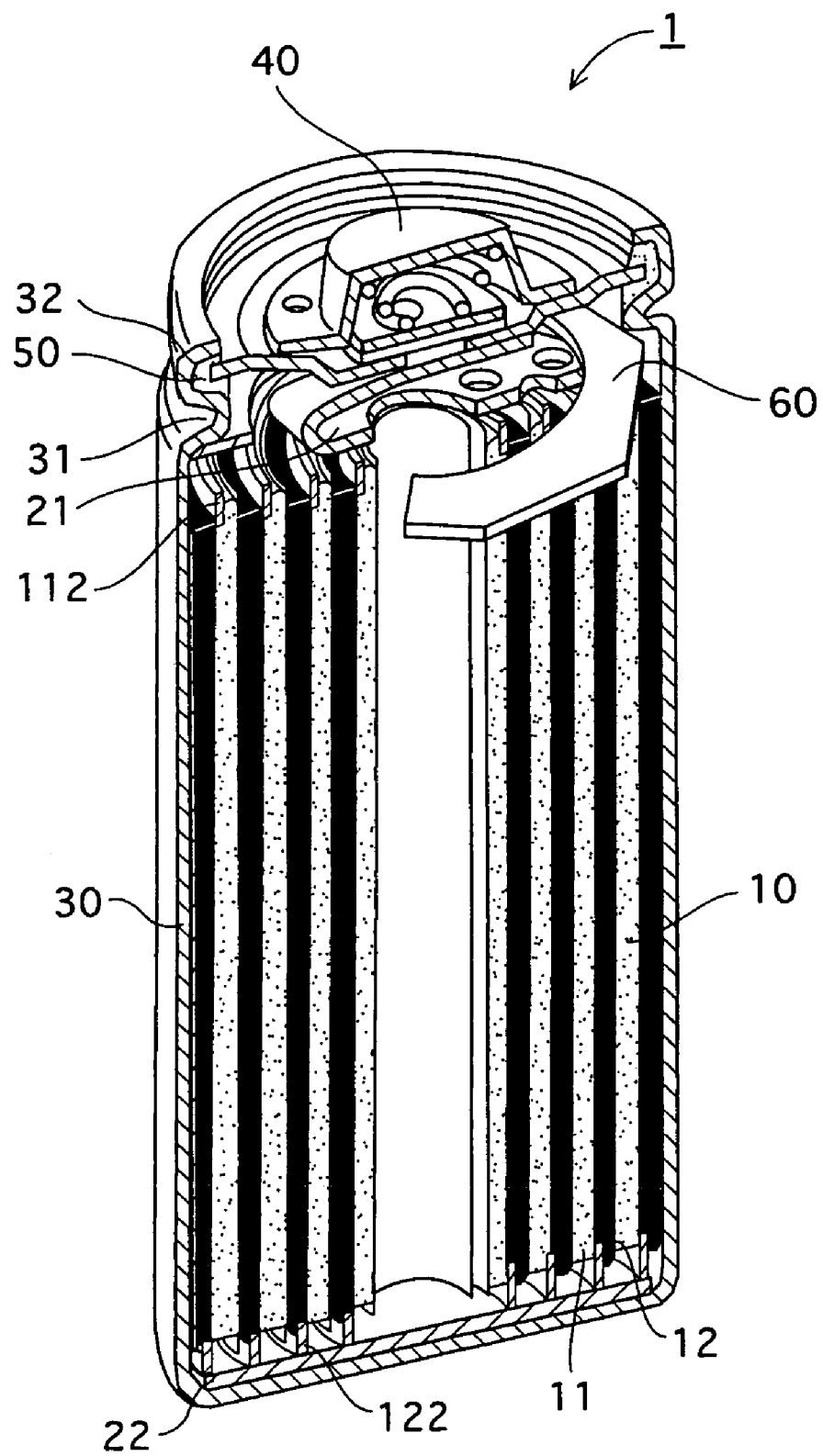
FIG. 1 is a perspective cross-sectional view of a Ni-MH battery pertaining to an embodiment of the present invention.

The following describes the structure of a Ni-MH battery 1 pertaining to the embodiment of the present invention, with reference to FIG. 1.

In FIG. 1, part of a casing 30 of the Ni-MH battery 1 is cut away to show the inside of the casing 30.

As FIG. 1 shows, the Ni-MH battery 1 basically has a structure in which an electrode assembly 10 is housed in a casing 30 filled with an electrolyte, and an opening thereof is sealed with a sealing lid 40.

Among the components included in the Ni-MH battery 1, the electrode assembly 10 is structured by winding a positive electrode plate 11 and a negative electrode plate 12, which are both belt-like and have been layered with a separator (not illustrated) sandwiched therebetween.

A positive collector plate 21 that is in a circular shape is connected to the top end of the electrode assembly 10, and a negative collector plate 22 that is also in a circular shape is connected to the bottom end of the electrode assembly 10.

The positive electrode plate 11 is structured from an electrode plate body formed from a nickel sponge sheet as a porous substrate filled with a nickel active material, and a lead terminal 112 connected to the top edge of the sheet as FIG. 1 shows.

The negative electrode plate 12 is structure from an electrode plate body formed from a punching metal sheet filled with a hydrogen storing alloy, and a lead terminal 122 that is made of a foil and connected to the bottom edge of the sheet as FIG. 1 shows.

The separator (not illustrated), inserted between the positive electrode plate 11 and the negative electrode plate 12 is structured from, for example, a polyolefin nonwoven fabric.

The lead terminal 112 as a belt-like metal foil (such as a nickel foil) is connected to the top edge of the positive electrode plate 11. The positive collector plate 21 is capable of collecting power from the positive electrode plate 11 as being connected to the lead terminal 112.

In the same manner, the lead terminal 122 is connected to the bottom edge of the negative electrode plate 12. The negative collector plate 22 is capable of collecting power from the negative electrode plate 12 as being connected to the lead terminal 122.

The sealing lid 40 is formed by affixing a safety valve and so on to a main body formed by performing deformation processing on a material such as a nickel-plated sheet steel.

The casing 30 is formed in a cylindrical shape having a bottom by performing deformation processing on a flat metal plate. The material thereof is a nickel-plated sheet steel, for example, that is the same as the material of the sealing lid 40.

Also, a short-diameter part 31, where the diameter is locally shorter, is provided near the opening of the casing 30. Furthermore, an insulating ring 60, having insulation properties and an octagon shape, is placed in the gap between the electrode assembly 10 and the short-diameter part 31.

Figure 2:
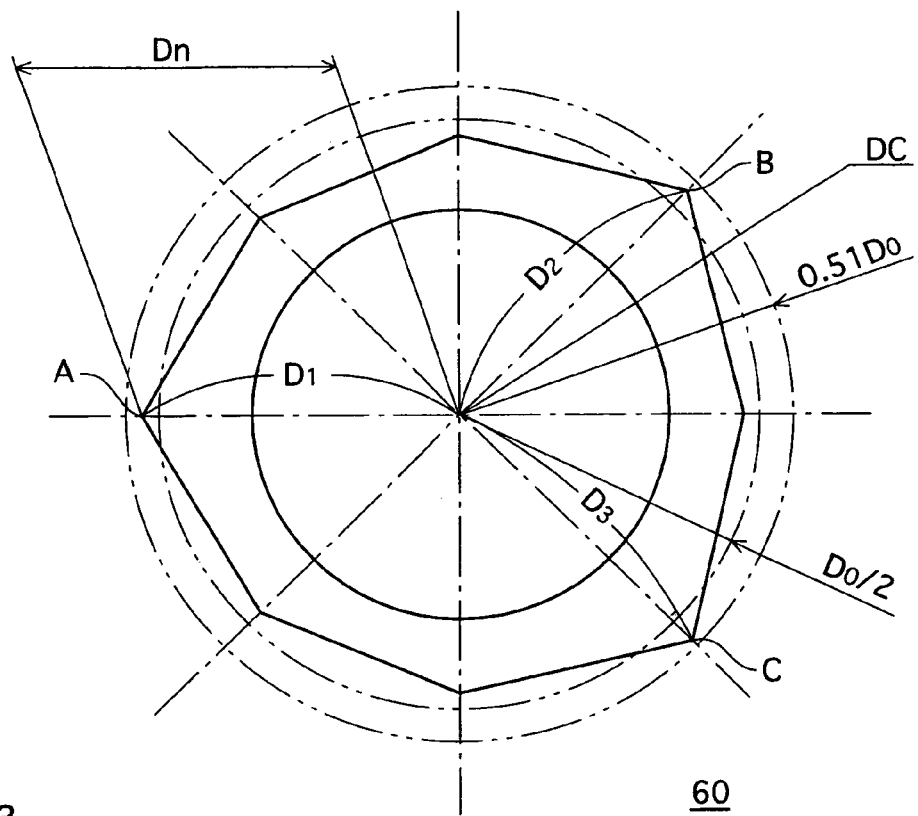
FIG. 2 is a plan view of an insulating ring pertaining to the embodiment of the present invention.

FIG. 2 is a plan view of the insulating ring 60.

The insulating ring 60 is a ring-shaped plate made of polypropylene. The thickness of the insulating ring 60 is 0.5 mm. Among eight apexes of the insulating ring 60, distances from three apexes to a design center point is longer than a distance from the other apexes.

Here, the design center point is a reference point for designing the ring, which is illustrated as a point DC in FIG. 2. Usually, the length of the outside diameter of the ring and so on are determined on the assumption that the design center point of the ring is at the center point of the inner circumference of the casing.

Shape of the Insulating Ring

The following describes the shape of the insulating ring 60 in detail.

$D_0$ is the inside diameter of the casing measured at a position where the insulating ring 60 is inserted. As FIG. 2 shows, among the eight apexes of the insulating ring 60, the points A, B and C are dispersively located, and the maximum diameters from the design center point to the outside edge of the insulating ring 60 measured at the points A, B and C are longer than $D_0/2$ and not longer than $0.51\ D_0$. Those measured at the other apexes are not longer than $D_0/2$.

In the following explanations, a point from which the maximum distance to the design center point is longer than $D_0/2$ and not longer than $0.51\ D_0$ is called "a contacting point" as a matter of convenience.

Since the insulating ring 60 is designed as described above, the points A, B and C have contact with the inner circumference of the casing 30 when the insulating ring 60 is inserted in the casing 30. Accordingly, the insulating ring 60 warps as pressed against the inner circumference at the points A, B and C toward the design center point. As a result, the insulating ring 60 is firmly fixed, and the misalignment and the jump-out problem can be prevented.

The pressure is caused-due to that the maximum distances from the points A, B and C to the design center point are longer than $D_0/2$.

Also, since the distances from the points A, B and C to the design center point is not longer than $0.51\ D_0$, the amount of the warp of the insulating ring 60 is appropriately adjusted. Furthermore, since the distances from the other apexes between the points A, B and C to the design center point are not longer than $D_0/2$, these apexes are not pressed against the inner wall of the casing 30. Therefore, at the insertion of the insulating ring 60 into the casing 30, the resistance of the insulating ring 60 against the casing 30 is not too large, which prevents occurrence of insertion defect.

Method for Setting Insulating Ring

The electrode assembly is inserted in the casing 30, and the before the short-diameter part 131 is formed, the insulating ring 60 is inserted from the opening of the casing 30. Then, the insulating ring 60 is pushed in by a rod-shaped jig having an outside diameter that is shorter than the inside diameter $D_0$ of the casing 30, such that the insulating ring 60 is pressed against the top surface of the electrode assembly.

As a result, the whole body of the insulating ring 60 warps, and positions of the contacting points and the virtual center of the insulating ring 60 with respect to the cylinder axis direction of the casing 30 are different.

The term "virtual center" is used above because a hole is provided in the center part of the insulating ring 60 and there is no physical part that serves as a reference point for measuring the height. The "virtual center" is a reference point for measuring the height on the assumption that the hole is not provided.

Notes

In the embodiment, a secondary battery is taken as an example for the explanation. However, the insulating ring pertaining to the embodiment may be applied to cylindrical primary batteries.

Figure 3:
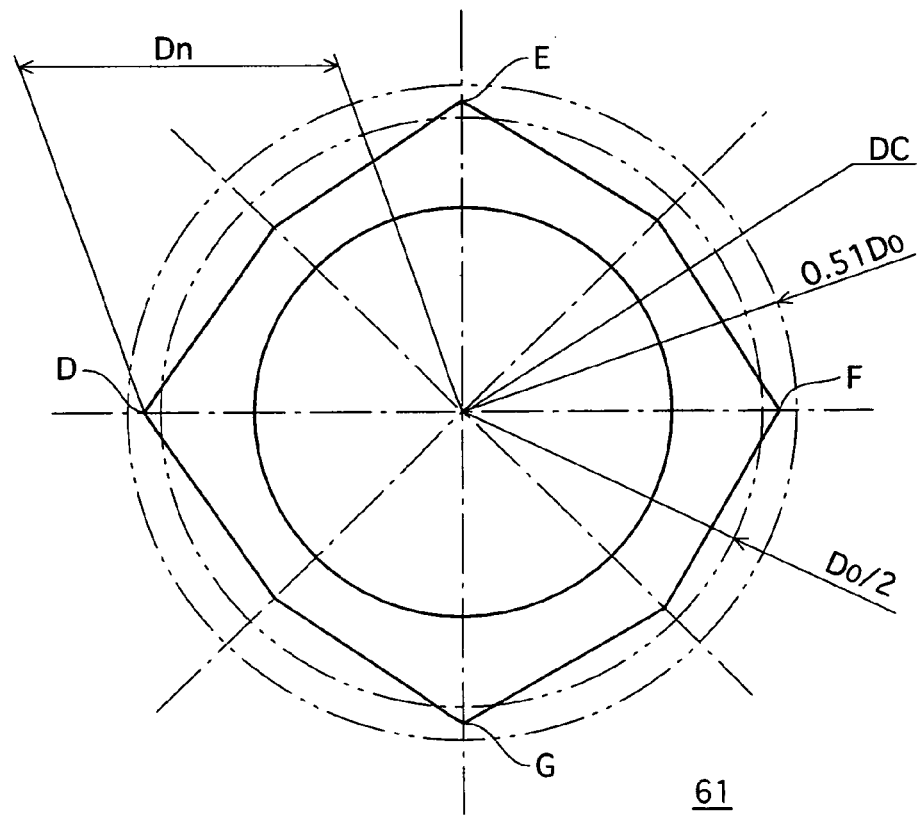
FIG. 3 is a plan view of an insulating ring pertaining to a modification of the present invention.

Also, although three contacting points are provided in the embodiment described above, four contacting points, namely D, E, F and G, may be provided as FIG. 3 shows.

An advantage of an insulating ring 61 having four contacting points is that two-contacting points can be formed on a line passing through the design center point (point DC). Accordingly, if the distance between each two contacting points on the same line is the maximum outside diameter of the insulating ring 61, it is very easy to measure the maximum outside diameter.

Since there are two pairs of such contacting points, if the distance between the contacting points is different from pair to pair, an average of the distances is assumed as the maximum diameter as a matter of convenience.

The term "the maximum outside diameter" used above defines an outside diameter of a circumcircle of a polygon whose apexes are the contacting points. This value affects the degree of the fitting of the insulating ring 60 into the casing 30.

It is possible to directly measure the maximum outside diameter using a vernier caliper or a micrometer.

As FIG. 2 shows, in the case where there are three contacting points and the distances from the design center point to the points A, B and C are respectively $D_1$, $D_2$ and $D_3$, the design center point is identical with the center point of the circumcircle only when the values of $D_1$, $D_2$, and $D_3$ are the same even if the values $D_1$, $D_2$ and $D_3$ are greater than the value $D_0/2$ and not greater than $0.51\ D_0$.

When the values $D_1$, $D_2$ and $D_3$ are slightly different from each other, the design center point (DC) and the center point of the circumcircle is not the same.

When calculating the maximum outside diameter of the insulating ring having three contacting points, it is required to calculate the diameter of the circumcircle of a triangle whose apexes are the three contacting points.

It is possible to provide five or more contacting points. However, if this is the case, it is necessary to determine the upper limit of the number of the contacting points such that the insertion resistance is not too large.

The inventors of the present invention determined the upper limited to be eight by predicting the degree of the increase of the insertion resistance as increasing the number of the contacting points.

As FIG. 2 and FIG. 3 show, when the number of the contacting points is from three to eight, the following condition expressions should be satisfied, where Dn is a distance from the design center point to the $n^{th}$ contacting points among the plurality of contacting points:

$$D_0/2 < Dn \leq 0.51 D_0 \quad \text{[Expression 1]}$$

$$3 \leq n \leq 8 \quad \text{[Expression 2]}$$

Confirmation Test

The following shows results of a test for confirmation the advantages of the present invention with regard to defects caused due to the insulating ring, namely the insertion defect, the misalignment and the jump-out problem.

The test was conducted with use of an insulating ring having four contacting points, such as the insulating ring 61 shown in FIG. 3.

TABLE 1

| | | Insulating Ring | Casing | | | |
| | | Outside | Inside | Defect occurrence rate (%) | | |
| | Outer Shape | Diameter (mm) | Diameter (mm) | Insertion Defect | Jump-out Problem | Total |
| --- | --- | --- | --- | --- | --- | --- |
| Example A | Octagonal | 22.1 | 22.0 | 0.0 | 0.1 | 0.1 |
| Example B | Octagonal | 22.2 | 22.0 | 0.0 | 0.1 | 0.1 |
| Example C | Octagonal | 22.3 | 22.0 | 0.1 | 0.0 | 0.1 |

TABLE 1-continued

|  | Insulating Ring | | Casing | | | |
|  | | Outside | Inside | Defect occurrence rate (%) | | |
|  | Outer Shape | Diameter (mm) | Diameter (mm) | Insertion Defect | Jump-out Problem | Total |
| Comparative Example A | Octagonal | 22.0 | 22.0 | 0.0 | 0.6 | 0.6 |
| Comparative Example B | Octagonal | 21.9 | 22.0 | 0.0 | 0.8 | 0.8 |
| Comparative Example C | Circular | 22.0 | 22.0 | 1.2 | 0.0 | 1.2 |

As Tab. 1 shows, only the examples A-C pertaining to the embodiment of the present invention achieved a low total defect rate, which is the total of the insertion defect and the jump-out problem (including the misalignment). Specifically, the total defect rate of the examples A-C is as low as 0.1%.

The occurrence rate of the jump-out problem decreases as the outside diameter of the insulating ring increases. However, the occurrence rate of the insertion defect increases accordingly. On the other hand, if the outside diameter of the vibration ring is small, the results would be the contrary. Therefore, in order to reduce both the insertion defect and the jump-out problem, it is necessary that the outside diameter is within the range of the diameters used in the examples A, B, C. In other words, the distance from the design center point to each contacting point should be greater than $D_0/2$ and not greater than $0.51 D_0$.

Other Issues

In the embodiment above, the contacting points are formed by simply shifting some apexes of the octagon outward in the diameter direction. However, the present invention is not limited to this. The contacting points may be points of projections from apexes of the octagon, such as the point H, J, and K illustrated in FIG. 4.

Moreover, although the basic shape of the insulating ring pertaining to the embodiment above is octagonal, the present invention is not limited to this. For example, projections L, M and N may be formed from the outer edge of a circular ring whose outside diameter is not greater than $D_0/2$, as FIG. 5 shows.

Figure 4:
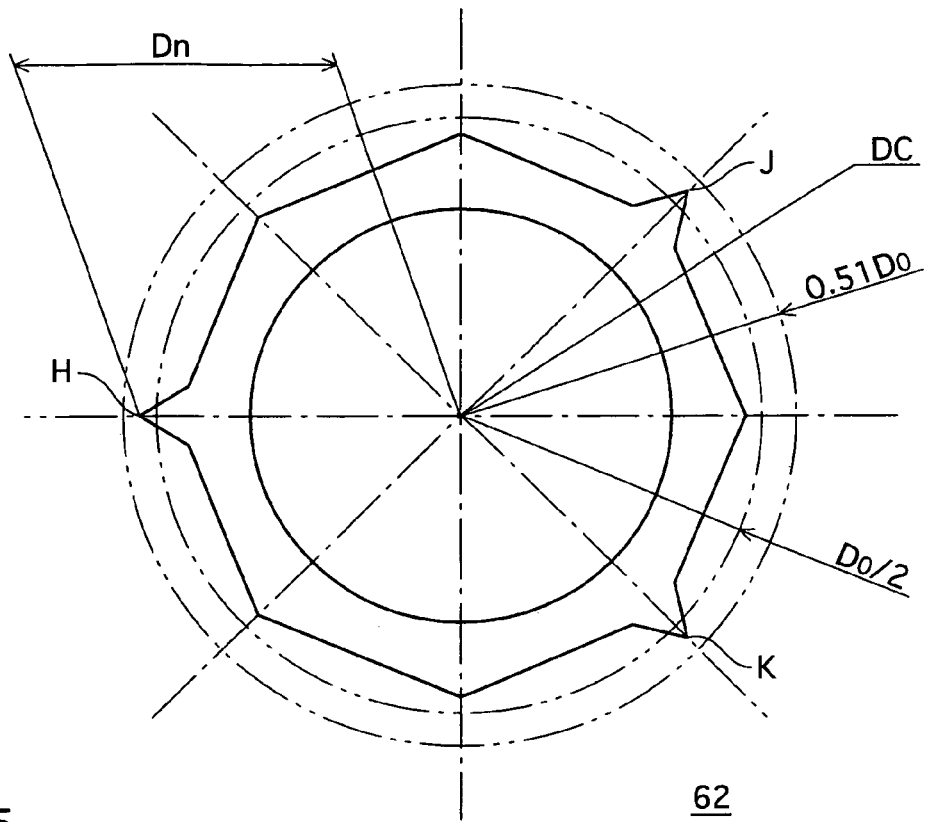
FIG. 4 is a plan view of an insulating ring pertaining to a modification of the present invention.
Figure 5:
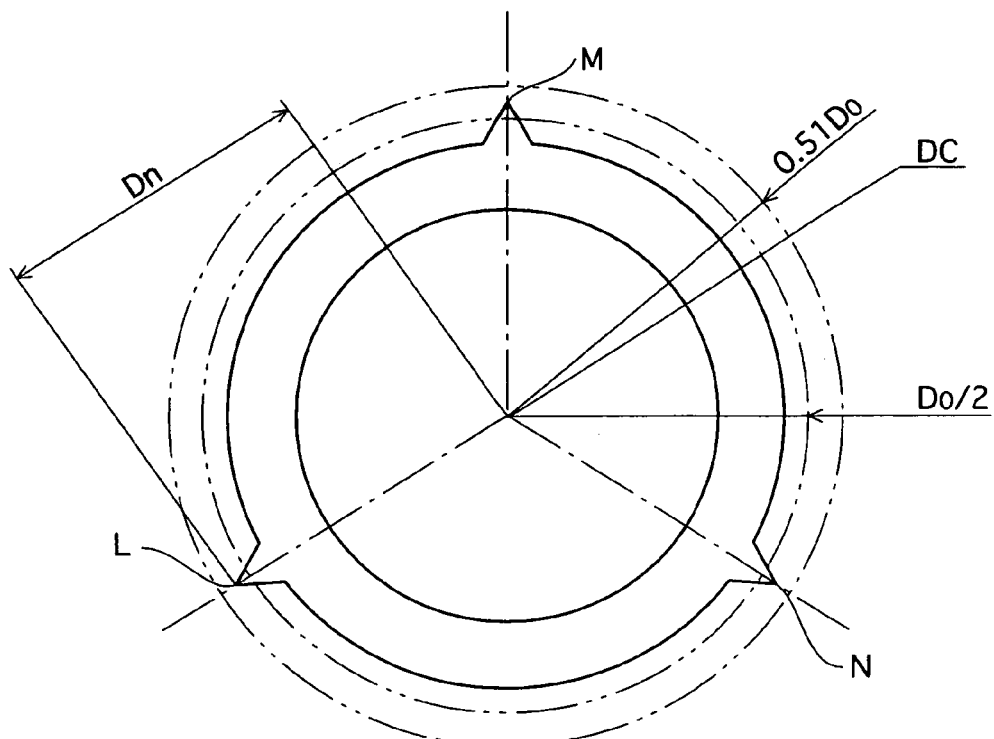
FIG. 5 is a plan view of an insulating ring pertaining to a modification of the present invention.
Figure 6A:
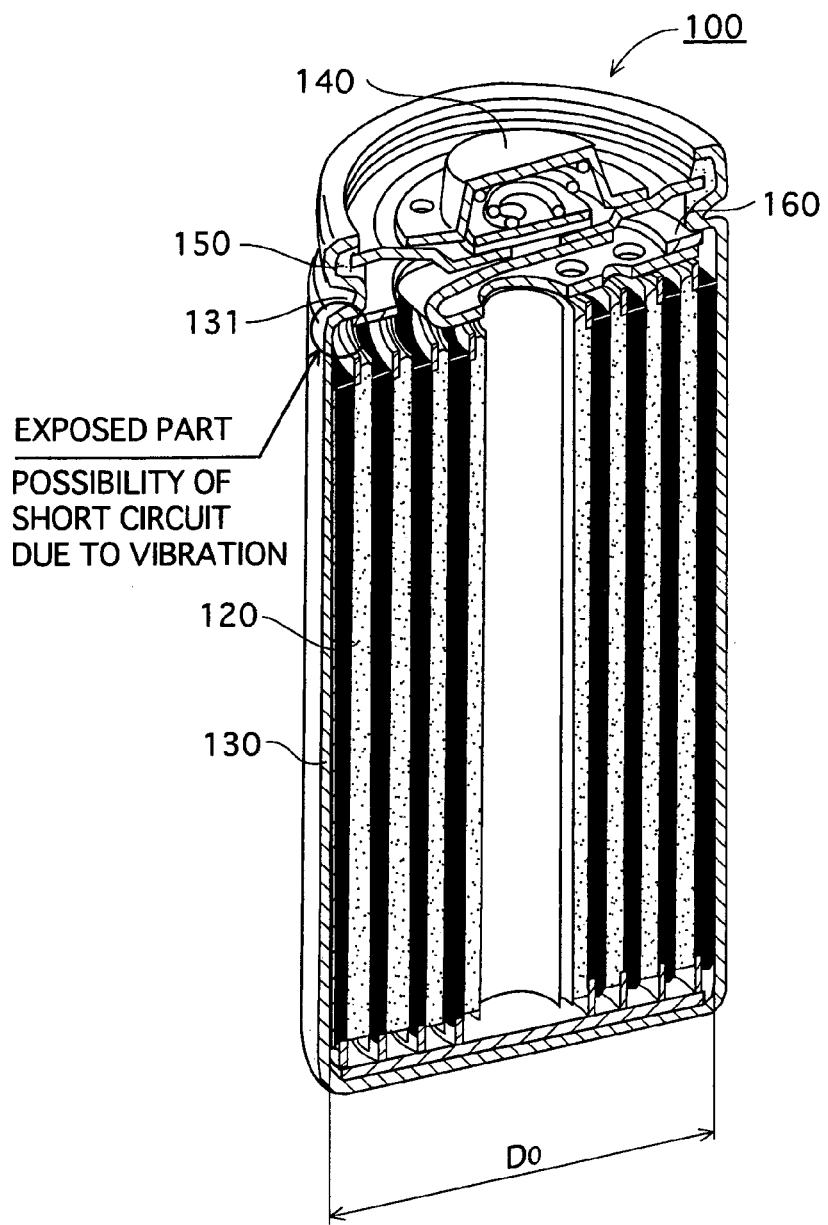
FIG. 6A is a perspective cross-sectional view of a Conventional cylindrical battery.
Figure 6B:
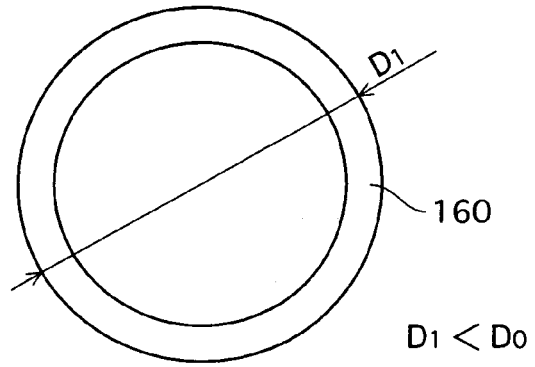
FIG. 6B is a plan view of an insulating ring used in the conventional cylindrical battery.

In the case shown in FIG. 4 and FIG. 5, the conditions to be fulfilled for each contacting point are the same as those with regard to FIG. 2 and FIG. 3, and the condition expressions 1 and 2 should be satisfied with regard to FIG. 4 and FIG. 5.

Also, as stated at the top of the "DESCRIPTION OF PREFERRED EMBODIMENT", although the present invention is described based on a Ni-MH battery as an example, the present invention is not limited to Ni-MH batteries. The present invention is applicable to various types of cylindrical batteries, such as nickel-cadmium (Ni—Cd) batteries, alkaline batteries, lithium batteries and lithium-ion batteries.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A cylindrical battery, comprising:
a casing that is in a shape of a cylinder having a bottom, and has a short-diameter part near an opening thereof;
an electrode assembly that is housed in the casing; and
a sealing plate that seals the opening,
wherein an insulating ring is inserted in a gap between the electrode assembly and the short-diameter part,
the insulating ring including a main body, and at least three projections that are dispersively located and project outward from an outer edge of the main body in a diameter direction, and
a distance between a design center point of the insulating ring and an outer edge of the main body is not longer than D/2 and a distance between the design center point and an outer edge of each of the projections is longer than D/2 and not longer than 102D/200, where D is an inside diameter of the casing measured within the gap.

2. The battery of claim 1,
wherein a count of the projections is up to eight.

3. A manufacturing method for a cylindrical battery, comprising the steps of:
housing an electrode assembly in a casing that is in a shape of a cylinder having a bottom;
swaging the casing near an opening thereof to form a short-diameter part; and
placing a sealing plate on the short-diameter part and sealing the short-diameter part with the sealing plate,
wherein the method further comprises the step of:
placing an insulating ring onto the electrode assembly after the electrode assembly has been housed in the casing and before the short-diameter part has been formed,
the insulating ring including a main body, and at least three projections that are dispersively located and project outward from an outer edge of the main body in a diameter direction,
a distance between a design center point of the insulating ring and an outer edge of the main body is not longer than D/2 and a distance between the design center point and an outer edge of each of the projections is longer than D/2 and not longer than 102D/200, where D is an inside diameter of the casing, and
in the step of swaging, the short-diameter part is formed nearer the opening than where the insulating ring is placed.

4. The manufacturing method of claim 3,
wherein the insulating ring is pressed from the opening to a bottom in the step of placing.

* * * * *